Aug. 14, 1928.

W. H. EVANS 1,680,466

REAMING TOOL

Filed July 28, 1924

Inventor
William H. Evans
by May W Zabel
Atty.

Patented Aug. 14, 1928.

1,680,466

UNITED STATES PATENT OFFICE.

WILLIAM H. EVANS, OF CHICAGO, ILLINOIS, ASSIGNOR TO EVANS FLEXIBLE REAMER CORPORATION, OF CHICAGO, ILLINOIS, A CORPORATION OF ILLINOIS.

REAMING TOOL.

Application filed July 28, 1924. Serial No. 728,657.

My invention relates to reaming and grinding tools, and more particularly to tools of this character that are adapted for truing the valve seats of an engine.

It is a further purpose of the invention to provide a reamer that will not cause chattering, which often seriously damages a valve seat by making a rough and uneven cut that is too deep in certain places and thus damages the valve seat to such an extent that it is very difficult to again make the same as smooth as is desirable.

It is another object of the invention to provide a reamer made out of a metal stamping that is provided with thin teeth that have a certain amount of resiliency to prevent chattering of the reamer. This flexibility of the teeth will cause the teeth to spring away from the work if they tend to cut too deeply, thus giving a smooth, even cut of the reamer.

It is still another purpose of the invention to provide a reamer made of a stamping so as to obtain a thin tooth that can be re-sharpened many times, thus making it possible to use the reamer until the entire tooth portion of the reamer is ground away, the cutting edge maintaining the same width throughout the height of the tooth.

It is another purpose of the invention to provide a reamer having teeth set at a plurality of different angles and to have said teeth arranged in two sets extending at different angles to the radial of the reamer to thus obtain an overlapping cutting action that produces a substantially smooth cut for each turn of the reamer.

It is still another purpose of the invention to provide the reamer with teeth that are slightly inclined rearwardly relative to the direction of turning of the reamer to thus cause said teeth to deflect away from the work rather than toward the same if an undue strain occurs on the teeth.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

Figure 1:
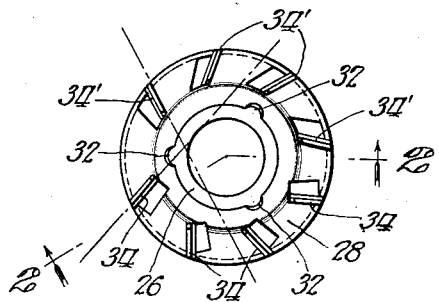
Fig. 1 is a face view of my improved reamer.

Referring in detail to the drawings, the reamer shown therein is mounted as usually is the case upon a suitable tapered spindle that enters a bore to properly align the reamer with the valve seat. To provide for mounting of the reamer on such a spindle, the reamer is provided with a solid metallic body portion which may be in the form of a casting or may be machined from a bar as desired, said body portion being indicated by the numeral 23 and being provided with a tapered bore 24. The body portion 23 of the reamer is provided with a beveled edge portion 25 and with an endwise extending flange portion 26 providing a seat 27 between the beveled portion 25 and said flange 26.

Figure 3:
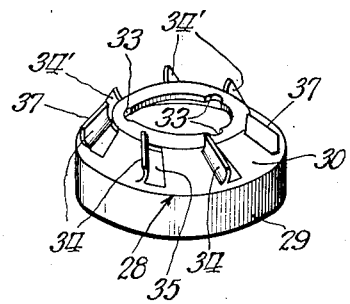
Fig. 3 is a perspective view thereof.

Mounted on said member 23 is a sheet metal cutter member 28 which is shown in perspective in Fig. 3. The member 28 is provided with a substantially cylindrical portion 29, a beveled or inclined portion 30 and a substantially radially extending portion 31. The cylindrical portion 29 embraces the member 23 on the outer diameter thereof, the inclined portion 30 lies against the bevelled seat 25 and the radially extending portion 31 lies against the shoulder 27. The flange 26 is preferably prick punched as indicated at 32 to secure the metal member 28 on the body portion 23. The member 28 is provided with suitable notches 33 for receiving the punched out material of the flanges to thus lock the member 28 against rotation relative to the member 23.

The inclined portion 30 of the member 28 is preferably punched out so as to provide upstanding teeth or cutting members 34 and 34' on said member 28, thus leaving openings 35 where the material is punched out below the teeth 34 and 34'. The cutting members 34 and 34' are arranged in two series, the members 34 constituting one series and the members 34' the other series. The teeth 34 are arranged so as to incline rearwardly from the radial direction inwardly from the outer edge thereof, while the teeth 34' are inclined forwardly of the radial at the inner edge thereof. In other words, the cutting edge of the teeth at the furthest removed point from the center of the device, in the case of the teeth 34, is forwardly of the innermost portion of said edge relative to a radial line, while with the teeth 34', the opposite is the case. Thus an overlapping cut of the teeth takes place that provides for an absolutely smooth surface after the reamer has been applied thereto.

Figure 2:
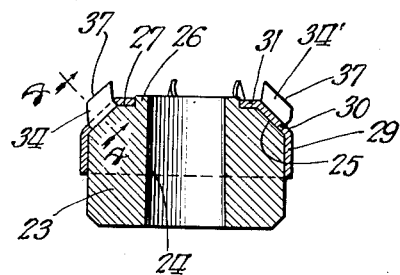
Fig. 2 is a section thereof taken on the line 2—2 of Fig. 1.
Figure 4:
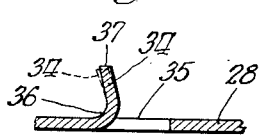
Fig. 4 is an enlarged detail sectional view thereof taken on the line 4—4 of Fig. 2.

The member 28 is preferably made of resilient sheet metal and the teeth are preferably inclined rearwardly relative to the direction of rotation of the device, the device rotating clockwise as shown in Figs. 1 and 3. The teeth are shown more in detail in Fig. 4. It will be evident that the teeth 34 are inclined somewhat rearwardly relative to a perpendicular to the surface 28 and are provided with a rounded portion or fillet 36 joining the same with the body portion of the sheet metal member 28. Thus if an unusual strain occurs, the teeth will be deflected rearwardly as indicated in dotted lines in Fig. 4 and the cutting edge 37 thereof will be forced away from the surface that is being reamed by the reamer, thus preventing any harmful action on the part of the reamer. This action of the reamer prevents chatter as the yielding moving of the teeth due to the resiliency of the device will prevent any taking of a deep cut by the reamer. It will be noted, upon reference to Fig. 2, that the cutting edges 37 of the teeth are in each case ground substantially parallel to the inclined or bevelled face 25 and it will be evident that such grinding can be done as often as desired to properly sharpen the teeth without in any way damaging the reamer until the reamer is ground down so that there are substantially no teeth left, this being due to the fact that the thickness of the teeth is the same throughout from top to bottom thereof.

Having thus described my invention, what I desire to claim and secure by United States Letters Patent is:

1. A device of the character described comprising a hollow sheet metal cutter member having a substantially conical portion with integral out-struck teeth thereon, said teeth being inclined to the radial in a plurality of series, the inclination of one series being opposite to that of the other series, said teeth being resilient and having their cutting face bent rearwardly relative to the direction of rotation from the base of the teeth whereby when the cutting edge strikes an obstacle the bending of the resilient tooth causes the edge to recede from the work.

2. A device of the character described comprising a hollow sheet metal cutter member having integral out-struck teeth thereon, said teeth being inclined rearwardly relative to the direction of rotation of the cutter member so that the cutting edge of each tooth may give away from the work when subjected to unusual strain.

3. A device of the character described comprising a hollow sheet metal cutter member having integral out-struck teeth thereon, said teeth being inclined to the radial in a plurality of series and rearwardly relative to the direction of rotation of the cutter member so that the cutting edge of each tooth may give away from the work when subjected to unusual strain.

In witness whereof, I hereunto subscribe my name this 3d day of July, A. D. 1924.

WILLIAM H. EVANS.